(12) United States Patent
Phelan

(10) Patent No.: US 10,259,465 B2
(45) Date of Patent: *Apr. 16, 2019

(54) DRIVER AUTHENTICATION SYSTEM AND METHOD FOR MONITORING AND CONTROLLING VEHICLE USAGE

(71) Applicant: THE PHELAN GROUP, LLC, Santa Fe, NM (US)

(72) Inventor: Michael Phelan, Santa Fe, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,322

(22) Filed: Feb. 16, 2018

(65) Prior Publication Data

US 2018/0251132 A1    Sep. 6, 2018

Related U.S. Application Data

(63) Continuation of application No. 14/712,124, filed on May 14, 2015, now Pat. No. 9,908,508, which is a continuation of application No. 13/858,930, filed on Apr. 8, 2013, now Pat. No. 9,045,101, which is a
(Continued)

(51) Int. Cl.
| | | |
|---|---|---|
| *G06F 19/00* | (2018.01) | |
| *B60W 40/08* | (2012.01) | |
| *B60R 25/00* | (2013.01) | |
| *B60R 25/23* | (2013.01) | |
| *B60R 25/20* | (2013.01) | |
| *B60R 25/102* | (2013.01) | |
| *B60W 50/00* | (2006.01) | |

(52) U.S. Cl.
CPC .......... *B60W 40/08* (2013.01); *B60R 25/00* (2013.01); *B60R 25/102* (2013.01); *B60R 25/20* (2013.01); *B60R 25/23* (2013.01); *B60W 2040/0809* (2013.01); *B60W 2050/0078* (2013.01)

(58) Field of Classification Search
None
See application file for complete search history.

(56) References Cited

U.S. PATENT DOCUMENTS

| | | | |
|---|---|---|---|
| 5,430,488 A | 7/1995 | Hedley | |
| 5,481,253 A * | 1/1996 | Phelan | B60R 25/04 307/10.2 |

(Continued)

*Primary Examiner* — Jonathan M Dager
(74) *Attorney, Agent, or Firm* — Kermit D. Lopez; Luis M. Ortiz; Loza & Loza, LLP

(57) ABSTRACT

A driver authentication and safety system and method for monitoring and controlling vehicle usage by high-risk drivers. A centralized database comprising a software application can be accessed by an authorized user via a data communications network utilizing a remote computer in order to configure a desired operating profile that matches requirements of the high-risk driver. The operating profile can be loaded to a driver identification and data logging device in conjunction with the remote computer. A master control unit receives a unique identification code from the data logging device to authenticate the high-risk driver and to operate the vehicle within the desired operating profile. A slave control unit receives commands from the master control unit and generates a real time alarm signal if the driver violates the preprogrammed operating profile unique to the driver.

20 Claims, 8 Drawing Sheets

Related U.S. Application Data continuation of application No. 12/496,509, filed on Jul. 1, 2009, now Pat. No. 8,417,415.

(60) Provisional application No. 61/077,568, filed on Jul. 2, 2008.

(56) References Cited

U.S. PATENT DOCUMENTS

| | | | |
|---|---|---|---|
| 6,430,488 B1* | 8/2002 | Goldman | B60R 25/00 307/10.1 |
| 6,741,920 B1* | 5/2004 | Otto | B60R 16/037 340/5.6 |
| 7,956,730 B2 | 6/2011 | White et al. | |
| 8,131,441 B2* | 3/2012 | Nallapa | B60W 30/188 701/87 |
| 8,258,939 B2* | 9/2012 | Miller | B60R 25/00 340/301 |
| 8,463,488 B1* | 6/2013 | Hart | G07C 5/008 340/576 |
| 8,751,104 B2 | 6/2014 | Hermann et al. | |
| 8,751,105 B2* | 6/2014 | Whelan | B60W 50/0098 180/268 |
| 2002/0049538 A1* | 4/2002 | Knapton | G01C 21/28 701/472 |
| 2003/0181822 A1* | 9/2003 | Victor | A61B 3/113 600/558 |
| 2003/0204290 A1* | 10/2003 | Sadler | B60R 25/04 701/1 |
| 2003/0231550 A1* | 12/2003 | Macfarlane | B60R 25/257 367/198 |
| 2004/0064221 A1* | 4/2004 | DePrez | B60T 7/042 701/2 |
| 2004/0225557 A1* | 11/2004 | Phelan | G01M 17/00 701/1 |
| 2005/0137757 A1 | 6/2005 | Phelan et al. | |
| 2005/0182538 A1 | 8/2005 | Phelan et al. | |
| 2005/0237150 A1* | 10/2005 | Sun | G07C 9/00182 340/5.52 |
| 2005/0288837 A1* | 12/2005 | Wiegand | B60R 16/037 701/36 |
| 2006/0047419 A1* | 3/2006 | Diendorf | G01C 21/26 701/532 |
| 2006/0066149 A1* | 3/2006 | Holloway | B60R 25/24 307/10.3 |
| 2006/0106515 A1 | 5/2006 | Phelan et al. | |
| 2006/0111817 A1 | 5/2006 | Phelan et al. | |
| 2006/0122749 A1 | 6/2006 | Phelan et al. | |
| 2006/0200008 A1* | 9/2006 | Moore-Ede | B60K 28/06 600/300 |
| 2006/0212195 A1* | 9/2006 | Veith | G06Q 10/06 701/33.4 |
| 2007/0082706 A1* | 4/2007 | Campbell | B60R 16/0373 455/563 |
| 2007/0129056 A1* | 6/2007 | Cheng | G06Q 30/02 455/405 |
| 2007/0155368 A1* | 7/2007 | Phelan | H04W 8/245 455/412.1 |
| 2007/0158128 A1* | 7/2007 | Gratz | B60R 25/1004 180/287 |
| 2007/0200663 A1* | 8/2007 | White | A61B 5/117 340/5.31 |
| 2008/0039998 A1* | 2/2008 | Fein | B60R 16/037 701/36 |
| 2008/0245598 A1 | 10/2008 | Gratz et al. | |
| 2008/0269979 A1* | 10/2008 | Hermann | H04L 41/082 701/29.6 |
| 2008/0319602 A1* | 12/2008 | McClellan | G07C 5/008 701/31.4 |
| 2009/0024273 A1* | 1/2009 | Follmer | G06Q 10/10 701/33.4 |
| 2009/0027177 A1* | 1/2009 | Hodder | B60R 25/04 340/426.12 |
| 2009/0030770 A1* | 1/2009 | Hersh | G06Q 10/06311 705/7.13 |
| 2009/0069954 A1* | 3/2009 | Aladesuyi | B60R 25/102 701/2 |
| 2009/0079555 A1* | 3/2009 | Aguirre De Carcer | G07C 5/008 340/441 |
| 2009/0189736 A1* | 7/2009 | Hayashi | G06F 21/32 340/5.81 |
| 2010/0004818 A1 | 1/2010 | Phelan | |
| 2010/0045452 A1* | 2/2010 | Periwal | B60Q 9/00 340/439 |
| 2010/0087986 A1* | 4/2010 | Lal | B60R 16/023 701/36 |
| 2010/0161171 A1* | 6/2010 | Valentine | B22D 11/12 701/31.4 |
| 2014/0358376 A1* | 12/2014 | Phelan | B60W 10/18 701/41 |
| 2015/0350750 A1* | 12/2015 | Yun | H04Q 9/00 340/870.07 |
| 2016/0001715 A1* | 1/2016 | Laifenfeld | B60R 16/023 701/32.7 |
| 2016/0001718 A1* | 1/2016 | Laifenfeld | H04W 84/005 701/32.7 |

* cited by examiner

DRIVER AUTHENTICATION SYSTEM AND METHOD FOR MONITORING AND CONTROLLING VEHICLE USAGE

INVENTION PRIORITY

The present application is a continuation of nonprovisional application Ser. No. 14/712,124, entitled "Driver Authentication System and Method for Monitoring and Controlling Vehicle Usage," filed May 14, 2015, which is a continuation of nonprovisional application Ser. No. 13/858,930, entitled "Driver Authentication System and Method for Monitoring and Controlling Vehicle Usage," filed Apr. 8, 2013, which is a continuation of nonprovisional patent application Ser. No. 12/496,509. entitled "Driver Authentication System and Method For Monitoring and Controlling Vehicle Usage," filed Jul. 1, 2009, which is a continuation of and claims the priority and benefit under 35 U.S.C. § 119(e) of provisional patent application No. 61/077,568, entitled "Systems and Methods for Monitoring and Controlling Vehicle Usage by Young Drivers", filed Jul. 2, 2008, which are all hereby incorporated by reference.

TECHNICAL FIELD

Embodiments are generally related to techniques for use in ensuring motor vehicle operation safety. Embodiments are also related to systems and methods for monitoring and controlling vehicle usage by high-risk drivers.

BACKGROUND OF THE INVENTION

The widespread usage of motor vehicles for both personal and work related activities places millions of vehicles on roads each day with their operation being largely unmonitored. Unmonitored vehicle operation can lead to issues including, for example, abusive use of the vehicle and lack of experience. With more young drivers getting licenses each year, there has been an unfortunate increase in accidents along with the ensuing damage, debilitating injuries and sometimes death. Most of these accidents are attributable to speeding and generally poor driving habits.

FIG. 1 illustrates a graphical representation 100 that depicts the actual deaths in passenger vehicles by age provided by National Highway Transportation Safety Administration (NHTSA). The curve 110 represents the death rate associated with male drivers and the curve 120 represents the death rate of female drivers. From the graph 100, it is clear that the distribution of age related deaths is bi-modal, and clearly depicts the relationship between youth and auto fatality. Current data indicates that the offering of a driver education course result in a great increase in the number of young licensed drivers without any decrease in the rate of fatal and serious crash involvement. Although such driver's education programs do teach safety skills, students are not motivated to utilize them and they actually foster overconfidence and do not fully consider safety issues.

The factors that have been researched and proven as the leading contributors to accidents, injuries and fatalities among, teens includes lack of driving experience, inadequate driving skills, risk-taking behavior, poor judgment and decision making, distraction and lack of focus. As a result of these factors, a higher proportion of teens are responsible for fatal crashes because of driving errors as evidenced by a larger percentage of crashes of single vehicles, a larger percentage of crashes involving speed a larger percentage of crashes involving other passengers.

Based on the foregoing it is believed that a need exists for an improved driver authentication system and method for monitoring and controlling vehicle usage by a high-risk driver. A need also exists for an improved method for identifying and authenticating the driver and programming the vehicle operating parameters that trigger control and driver feedback intervention, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved driver authentication system and method.

It is another aspect of the present invention to provide for an improved system and method for monitoring and controlling vehicle usage by high-risk drivers.

It is further aspect of the present invention to provide for an improved method for identifying and authenticating the driver and programming the vehicle operating parameters that trigger control and driver feedback intervention.

The aforementioned aspects and other objectives and advantages can now be achieved as described herein. A driver authentication system and method for monitoring and controlling vehicle usage by a high-risk driver (e.g., teen driver, fleet or rental drivers, habitual reckless drivers, etc.) is disclosed. A proprietary and centralized database comprising a software application can be accessed by an authorized user via a network utilizing a remote computer in order to configure a desired operating profile that matches requirements of the high-risk driver. The operating profile can be loaded to a driver identification and data logging device in conjunction with the remote computer. A master control unit can receive a unique identification code from the data logging device to authenticate the high-risk driver and to operate the vehicle within the desired operating profile. A slave control unit receives commands from the master control unit and generates a real time alarm signal if the driver violates the preprogrammed operating profile unique to the driver.

The alarm signal generated by the slave control unit can remain until the driver corrects the operating condition and brings the vehicle within the desired operating profile. Also, the system can provide an alarm signal to the authorized user (e.g., parent) utilizing an auto dial feature that communicates the authorized user via a telephone or internet when the driver violates preprogrammed operating profile. The operating parameters can be for example, but not limited to, data concerning maximum allowable vehicle speed, vehicle location, vehicle hours of operating and seat belt usage. The slave control unit can generate the alarm signal via a voice synthesized means, sounding a cabin buzzer, toggling the dome light and/or powering the radio off, etc. The driver identification and data logging device can allow identification of various drivers associated with the vehicle, thereby allowing the vehicle to perform in one way for the intended high-risk drivers, yet another way for the authorized user. The system can include a GPS (Global Positioning System)

module to determine and measure parameters such as, time of day, speed and location data associated with the vehicle.

The driver authentication system can include additional features such as data logging, alarming, operation governance, ease of programmability and can utilize GPS technology to provide high-risk driver safety. The system also provides user awareness that reduce the likelihood of a high-risk driver injury or fatality by helping the high-risk drivers with safe driving habits through immediate and real time feedback and governing. The programmable operating parameters associated with the real time driver feedback can categorize the system as a unique driver safety device. Additionally, the system and method described herein can provide multiple operating profiles for a single vehicle that allows the owners to operate the vehicle without any restrictions yet have restrictions in affect when the vehicle is operated by the high risk driver.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 2:
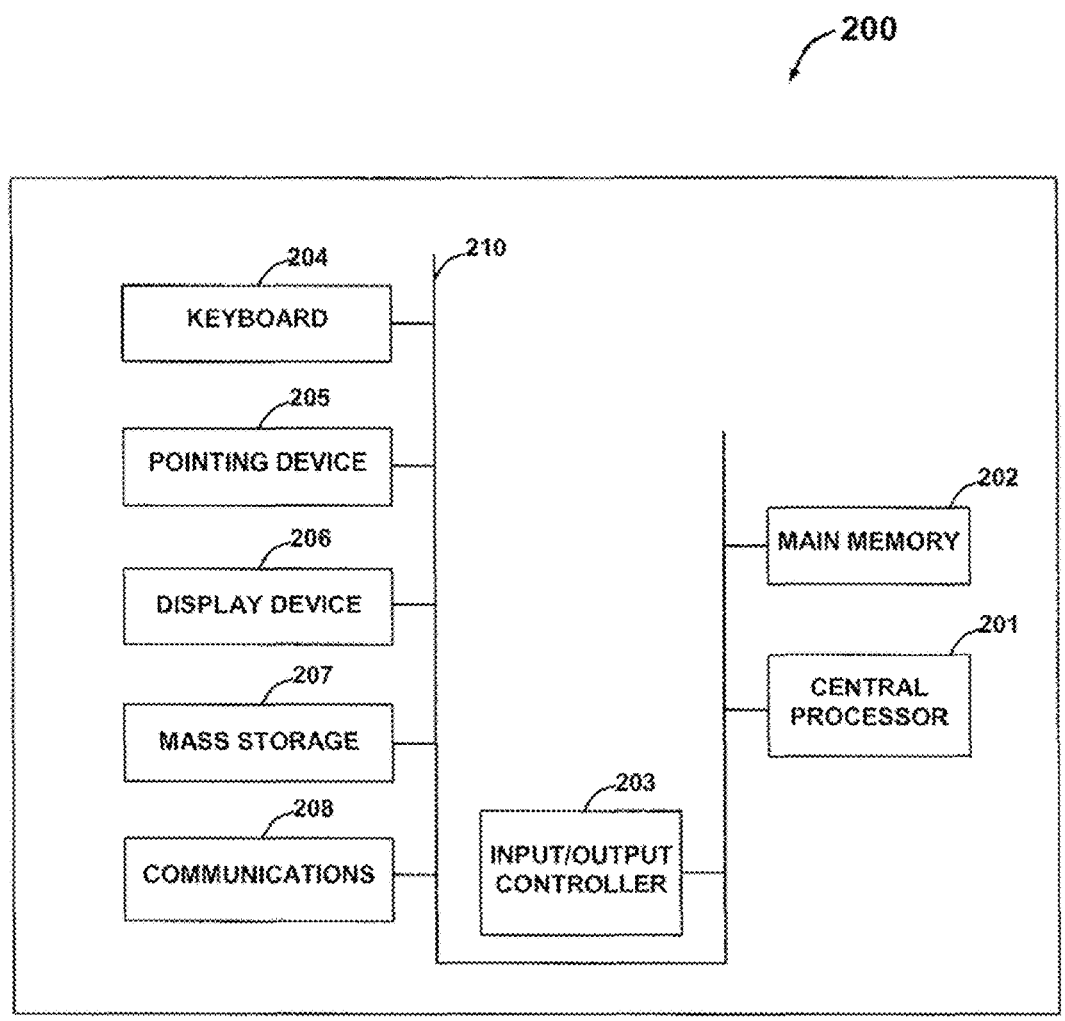
FIG. 2 illustrates a schematic view of a computer system in which the present invention can he embodied.
Figure 3:
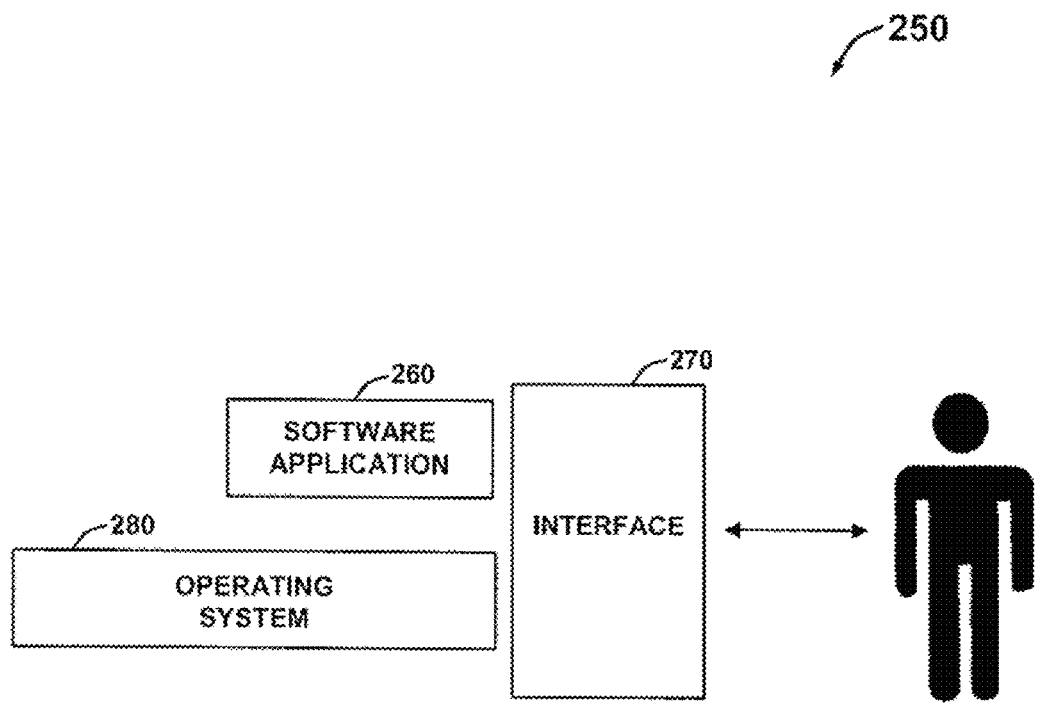
FIG. 3 illustrates a schematic view of a software system including an operating system, application software, and a user interface that can be used for carrying out the present invention.
Figure 4:
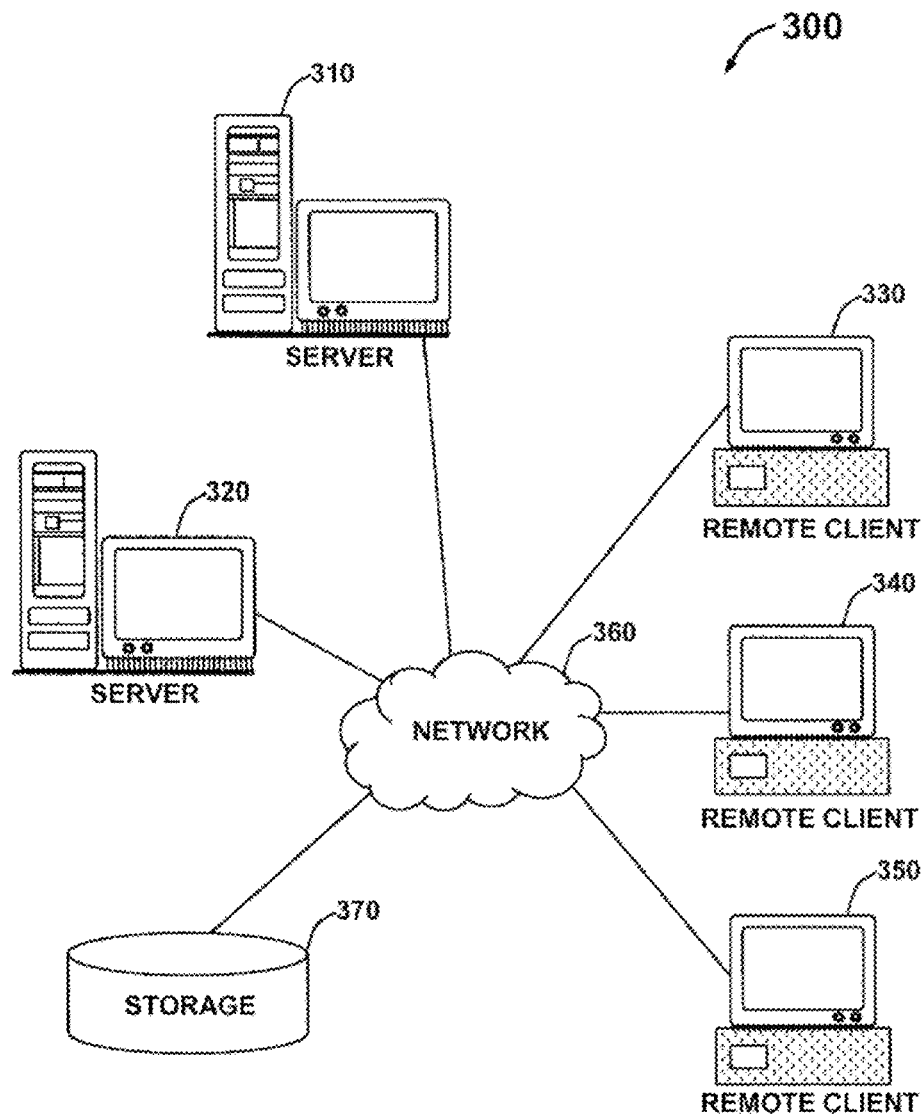
FIG. 4 depicts a graphical representation of a network of data processing systems in which aspects of the present invention can he implemented.

FIGS. 2-4 are provided as exemplary diagrams of data processing environments in which embodiments of the present invention may be implemented. It should be appreciated that FIGS. 2-4 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 2, the present invention may be embodied in the context of a data-processing apparatus 200 comprising a central processor 201, a main memory 202, an input/output controller 203, a keyboard 204, a pointing device 205 (e.g., mouse, track ball, pen device, or the like), a display device 206, and a mass storage 207 (e.g., hard disk). Additional input/output devices, such as wireless communications 208, may be included in the data-processing apparatus 200 as desired. The wireless communications 208 can include cellular, GPS, satellite, etc. As illustrated, the various components of the data-processing apparatus 200 communicate through a system bus 210 or similar architecture.

Figure 1:
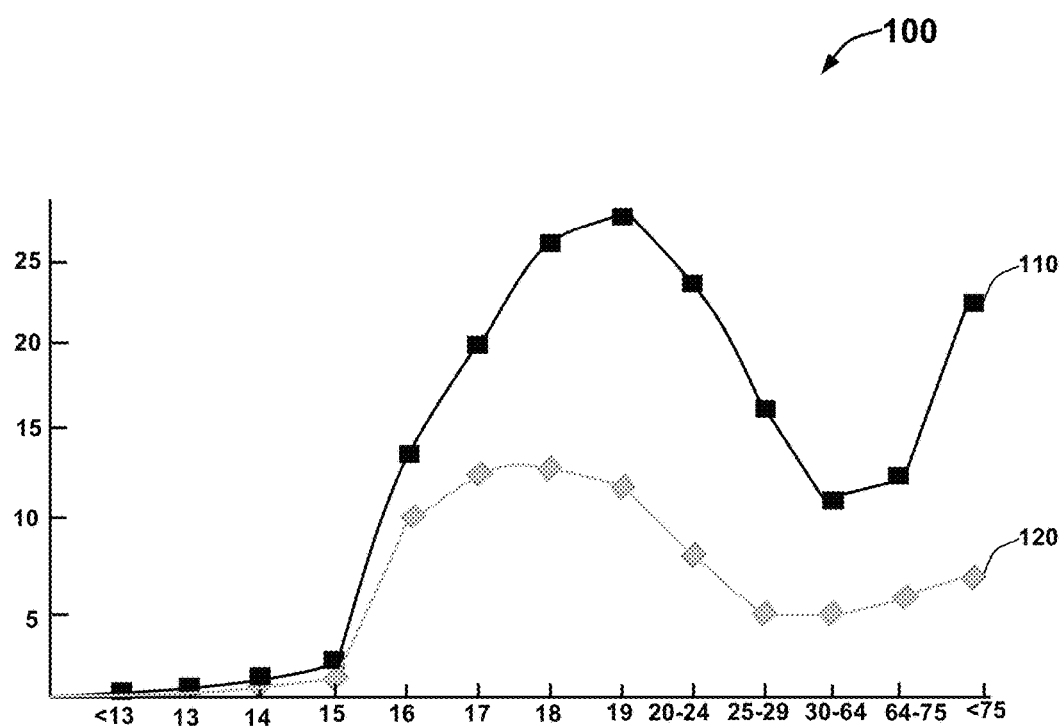
FIG. 1 illustrates a graphical representation depicting actual deaths in passenger vehicles by age.

FIG. 3 illustrates a computer software system 250 for directing the operation of the data-processing apparatus 200 depicted in FIG. 1. Software system 250, which is stored in main system memory 202 and on disk memory 207, can include a kernel or operating system 280 and a shell or interface 270. One or more application programs, such as software application 260, may be "loaded" (i.e., transferred from mass storage 207 into the main memory 202) for execution by the data-processing apparatus 200. The data-processing apparatus 200 receives user commands and data through user interface 270; these inputs may then be acted upon by the data-processing apparatus 200 in accordance with instructions from operating module 280 and/or application module 260.

The interface 270, which is preferably a graphical user interface (GUI), also serves to display results, whereupon the user may supply additional inputs or terminate the session. In one possible embodiment, operating system 280 and interface 270 can be implemented in the context of menu-driven systems. It can be appreciated, of course, that other types of systems are possible. For example, rather than a traditional menu-driven system, other operation systems can also be employed with respect to operating system 280 and interface 270. Software Application Module 260 can be adapted for monitoring and controlling vehicle usage high-risk drivers utilizing an operating profile. Software application module 260 can be adapted for providing a real time alarm signal if the driver violates the operating profile. Software application module 260, on the other hand, can include instructions, such as the various operations described herein with respect to the various components and modules described herein, such as, for example, the method 600 depicted in FIG. 7.

The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

FIG. 4 depicts a graphical representation of a network of data processing systems 300 in which aspects of the present invention may be implemented. Network data processing system 300 is a network of computers in which embodiments of the present invention may he implemented. Network data processing system 300 contains network 360, which is the medium used to provide communications links between various devices and computers connected together within network data processing apparatus 200. Network 360 may include connections, such as wire, wireless communication links, or fiber optic cables.

In the depicted example, server 310 and server 320 connect to network 360 along with storage unit 370. In addition, remote clients 330, 340, and 350 connect to network 360. These remote clients 330, 340, and 350 may be, for example, vehicle-based or portable computers. Data-processing apparatus 200 depicted in FIG. 2 can be, for example, a client such as client 330, 340, and/or 350. Alternatively, data-processing apparatus 200 can be implemented as a server, such as servers 320 and/or 310, depending upon design considerations.

In the depicted example, server 320 provides data, such as operating commands, operating system images, and applications to clients 330, 340, and 350. Remote clients 330, 340, and 350 are clients to server 320 in this example. Network data processing system 300 may include additional servers, clients, and other devices not shown. Specifically, clients may connect to any member of a network of servers which provide equivalent content.

In the depicted example, network data processing system 300 is the Internet with network 360 representing a worldwide collection of networks and gateways that use the Transmission Control Protocol/Internet Protocol (TCP/IP) suite of protocols to communicate with one another At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, cellular, satellite, or other wireless communications means.

The following description is presented with respect to embodiments of the present invention, which can be embodied in the context of a data-processing system such as data-processing apparatus 200, computer software system 250 and network 360 depicted respectively in FIGS. 2-4. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 5:
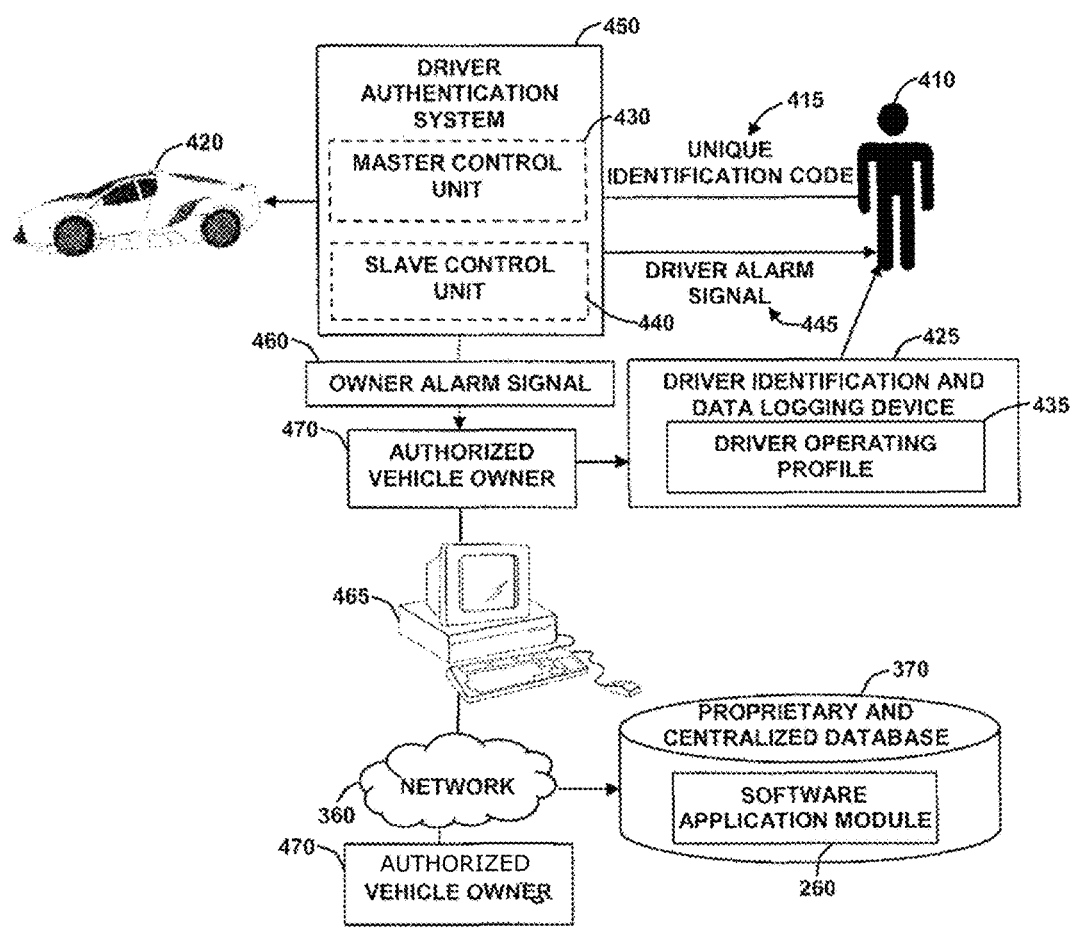
FIG. 5 illustrates a block diagram of a driver authentication system, in accordance with an embodiment.

FIG. 5 illustrates a block diagram of a driver authentication system 450, in accordance with an embodiment. Note that in FIGS. 1-8, identical or similar blocks are generally indicated by identical reference numerals. The driver authentication system 450 can be utilized for monitoring and controlling vehicle usage by high-risk drivers such as driver 410. The high-risk drivers can be, for example, teen drivers, fleet and rental drivers, and habitual wreck less drivers, etc. The authentication system 450 can provide effective training and safety means for the high-risk driver 410 by setting safe operating parameters. The system 450 monitors a vehicle 420 and provide a real time driver corrective feedback to an authorized vehicle owner 470 of the vehicle 420.

The system 450 generally includes a master control unit 430 and a slave control unit 440 that can be accessed and programmed via the software application module 260 stored in the proprietary and centralized database 370. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may he configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to forma program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, CD ROMs, CD-Rs, etc., and transmission media, such, as signals transmitted over digital and/or analog communication links. Examples of transmission media can also include devices such as modems, which permit information to be transmitted over standard cellular communications and/or the more advanced wireless data communications.

The proprietary and centralized database 370 including the software application 260 can be accessed via a remote computer 465 and the network 360. Note that the remote computer 465 can be a data processing apparatus 200 depicted in FIG. 2. The authorized vehicle owner 470 can access the software application 260 over a data network 360, via the remote computer 465 in order to program a desired operating profile 435 representing various operating parameters associated with the vehicle 420. Note that the operating parameters can be for example, but not limited to, data concerning maximum allowable vehicle speed, vehicle locations, vehicle hours of operation and seat belt usage associated with the vehicle 420. The system 450 can also track various other features such as for example, data concerning hard braking and fast cornering, etc. Note that these features are not viewed as a key risk factor and therefore can be offered as additional features to the basic operating parameters of the driver authentication system 450.

The authorized vehicle owner 470 can be for example, but not limited to a parent of a teen, a fleet manager or operator and a judicial authority, etc. The operating profile 435 programmed by the owner 470 can include a set of driving rules and conditions that best fit the requirements of the intended high-risk driver 410 within the vehicle 420. Further, the operating profile 435 can be loaded to a driver identification and data logging device 425. The driver identification and data logging device 425 can be a USB compatible device such as for example, iButton, radio frequency identification device (RFID), etc., that can be utilized in conjunction with the remote computer 465 in order to load the operating profile 235 into the master control unit 430.

The driver identification and data logging device 225 can allow identification of various drivers 410 associated with the vehicle 420, thereby allowing the vehicle 420 to perform one way for the intended high-risk driver 410, yet another way for the authorized vehicle owner 470.

The data logging device 425 can be connected to the remote computer 465 and the operating profile 435 can be stored. Once the required information is copied into the data logging device 425, the device 425 can be disconnected from the remote computer 465 and can be placed on a driver key ring (not shown). The master control unit 430 can authenticate the driver 410 utilizing a unique identification code 415 provided by the driver identification and data logging device 425. Further, the master control unit 430 can enable vehicle operation within the programmed operating profile 435. If the driver 410 violates the preprogrammed operating profile 435 the master control unit 430 can communicate with the slave control unit 440 and generate a real time driver alarm signal 445. The alarm signal 445 can result in an actual audible alarm, or it can he used to control/govern operational aspects of the vehicle. For example, the real time driver alarm signal 445 can be used to communicate conditions to the driver, limit/disable radio functionality, govern mechanical operations (e.g., lower/limit speed), remotely contact vehicle owners/fleet managers, and other electrical or mechanical functions, while maintaining driver and occupant safety.

The driver alarm signal 445 generated by the slave control unit 440 can remain until the driver 410 corrects the operating conditions and brings the vehicle 420 within the programmed operating profile 435. The slave control unit 440 can generate the driver alarm signal 445 via a voice synthesized means, sounding a cabin buzzer, toggling the dome light and/or cutting the radio off, etc. Also, the system 450 can provide an owner alarm signal 460 that remotely alerts the authorized vehicle owner 470 regarding violation of the programmed operating profile 435. The owner alarm signal 460 can be an auto dial feature that communicates the authorized owner 470 via a cellular or data network.

Figure 6:
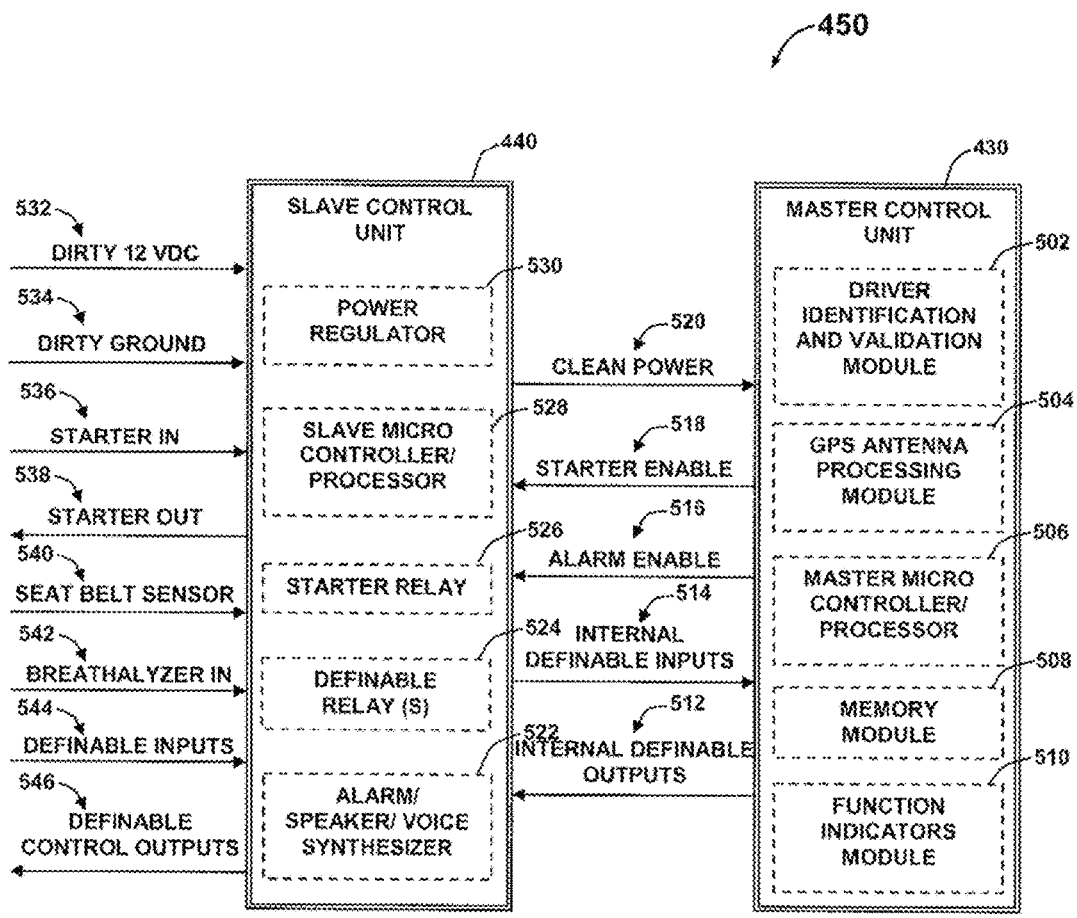
FIG. 6 illustrates a schematic block diagram of the driver authentication system for monitoring and controlling vehicle usage, in accordance with an embodiment.

FIG. 6 illustrates a schematic block diagram of the driver authentication system 450, in accordance with an embodiment. The master control unit 430 can authenticate the driver 410 utilizing the unique identification code 415 provided by the data logging device 425. The data logging device 425 associated with the master control unit 430 can be collectively called as 'brain' of the driver authentication system 450. The master control unit 430 can be installed, in the vehicle 420 in a suitable place where the master control unit 430 can be directly exposed to the driver from a dash board of the vehicle 420.

The master control unit 430 can be configured to include driver identification and validation module 502, a GPS antenna processing module 504, a master micro controller and processor 506, a memory module 508 and a function indicator module 510. The driver identification and validation module 502 can be utilized to authenticate the driver 410 utilizing the unique identification code 415 and enable the vehicle operation. The master control unit 430 can interpret driver authorization, and ascertain the vehicle speed. The master control unit 430 also interprets the location and time of day parameters versus maximum desired threshold limits.

The GPS antenna processing module 504 can be utilized to determine and measure time of day, speed and location data of the vehicle 420. The GPS antenna processing module 504 provides location information associated with the vehicle 420 to the authorized vehicle owner 470 hence the system 450 is compatible for any vehicle for monitoring and controlling the high-risk driver 410. The master microcontroller/processor 506 can process and control the operations associated with the master control unit 430. The memory module 508 associated with the master control unit 430 can be utilized to store the driver authentication 415 and operating profile 435 associated with the driver 410. The memory module 508 can further provide information for proper operation of the vehicle 420. The function indicator module 510 can monitor various functions in association with the vehicle 420 such for example, power, fault detection and monitoring, and other functions.

The master control unit 430 can communicate and send commands to the slave control unit 440 associated with the driver authentication system 450. The slave control unit 440 can include a power generator 530, a slave micro controller and processor 528, a starter relay 526, a definable relay 524, and an alarm synthesizer 522. The slave control unit 440 can be mounted under the dash board of the vehicle 420. The slave control unit 440 can receive wireless commands from master control unit 430 and generates the alarm signal 445 and 460. The slave control unit 440 can include pins such as a dirty 12 VDC pin 532, a dirty ground pin 534, a starter in pin 536, a starter out pin 538, seat belt sensor pin 540, a breathalyzer pin 542. a definable input pin on dash slave control unit 440.

The power regulator 530 can be utilized to regulate a power source and operate the system 450 via the dirty 12 VDC pin 532 and the dirty ground pin 534. The starter relay 526 can be an electromechanical device that is operated by an electrical current that is provided by the starter in pin 536. The starter relay 526 can be enabled by a starter enable signal 518 from the master control unit 430 when the driver 410 is authenticated. The starter relay 426 can generate an output via a starter out pin 538 that can be a mechanical function utilized to operate the vehicle 420. The seat belt sensor pin 540 can be externally connected to a seat belt sensor associated with the vehicle 420 where it obtains the information regarding usage of seat belt by the driver 410.

The breathalyzer 542 in pin 524 can provide status regarding alcohol consumption of the driver 410 while driving the vehicle 420. The slave microcontroller/processor 528 can process and control the operations of the slave control unit 440. The alarm/speaker/voice synthesizer 522 can receive the alarm enable signal 516 from the master control unit 430 and generate the owner programmed driver alarm signal 445 in the vehicle 420 when the driver 410 violates the programmed parameters. Further, the master control unit 430 and the slave control unit 440 can be communicated via various communication signal lines such as a clean power signal 520, an alarm enable signal 516, internal definable input signal 514 and an internal definable output signal 512.

Figure 7:
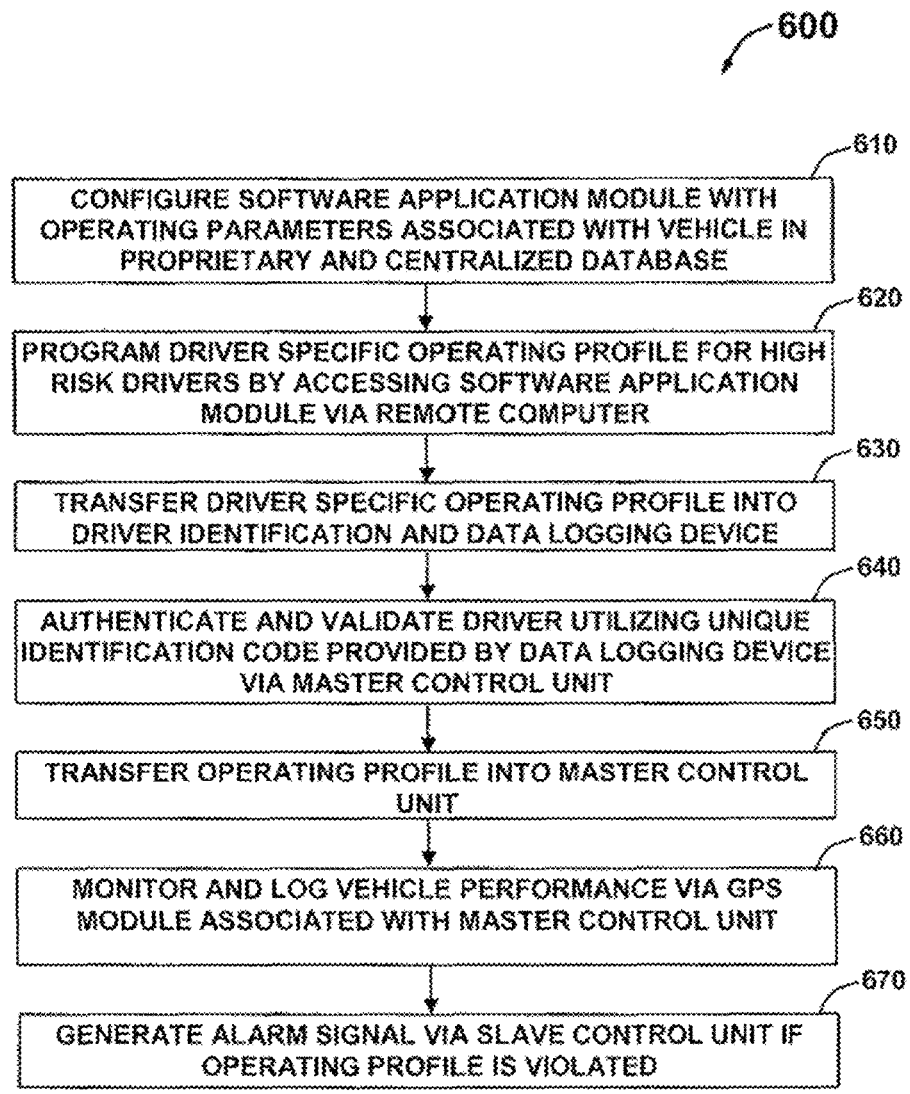
FIG. 7 illustrates a flow chart of operation illustrating logical operation steps of a method for monitoring and controlling vehicle usage, in accordance with embodiments.

FIG. 7 illustrates a flow chart of operation illustrating logical operation steps of a method 600 for monitoring and controlling vehicle usage, in accordance with an embodiment. The software application module 260 with operating parameters associated with the vehicle 420 can be configured and stored in the proprietary and centralized database 370, as depicted at block 610. The driver specific operating profile 435 for the high-risk driver 410 can be programmed by accessing the software application 260 via the remote computer 465, as indicated at block 620. Note that the software application 260 can include programming software that can be utilized to program the features of the driver authentication system 450. The software application module 260 monitors various parameters such as the 'trigger' levels for speed, and time of operation, etc. The software application module 260 can be accessible by the authorized owners 470 and can also be utilized to download the actual data logged during the operation of the vehicle 420. Further, the software application 260 can also be intuitive for the customer through the process of selecting parameters, trigger thresholds, etc.

The operating profile 435 for the driver 410 can be loaded to the driver identification and data logging device 425, as illustrated at block 630. The master control unit 430 can authenticate and validate the driver 410 utilizing the unique identification code 415 provided by the driver identification and data logging device 425, as indicated at block 640. The operating profile 435 for the driver 410 can be transferred to the master control unit 430, as shown at block 650. The master control unit 430 monitors and logs vehicle performance via the GPS module 504 associated with master control unit 430, as depicted at block 660. The slave control unit 440 generates the driver alarm signal 445, if the driver 410 violates the programmed operating profile 435, as illustrated at block 670.

Figure 8:
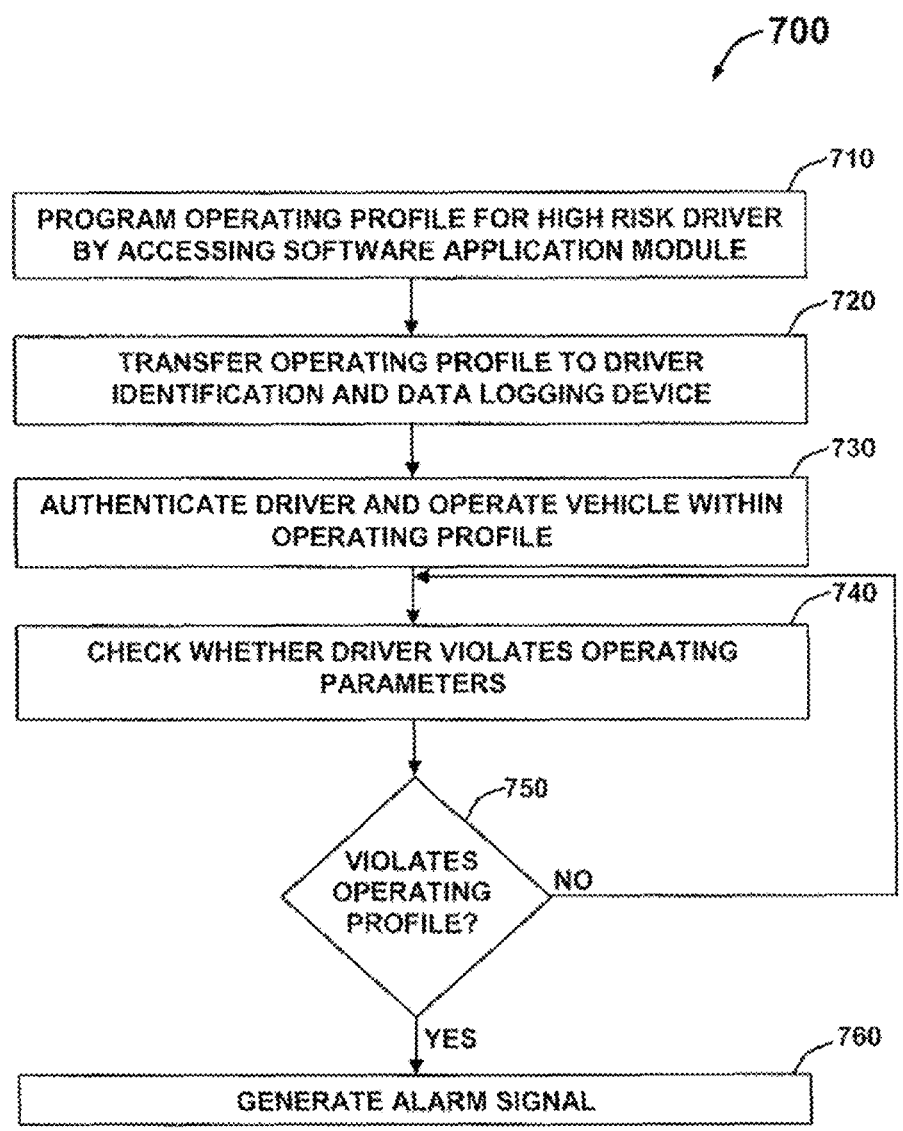
FIG. 8 illustrates a high level flow chart of operation illustrating logical operation steps of a method for monitoring and controlling vehicle usage by a high-risk driver, in accordance with embodiments.

FIG. 8 illustrates a high level flow chart of operation illustrating a method 700 for monitoring and controlling vehicle usage by the high-risk driver 410, in accordance with an embodiment. Again as reminder, in FIGS. 1-8, identical or similar blocks are generally indicated by identical reference numerals. The operating profile 435 for the high-risk driver 410 can be, programmed by accessing the software application 260 via, the remote computer 465, as depicted at block 710. The programmed operating profile 435 for the high-risk driver 410 can be transferred into the driver identification and data logging device 425, as illustrated at block 720.

The driver 410 can be authenticated utilizing the unique identification code 415 provided by the driver identification and data logging device 425 and the programmed operating profile 435 for the driver 410 can be copied into the driver authentication system 450, as depicted at block 730. A determination can be made whether the driver 410 violates the operating profile 435, as illustrated at block 740. If the driver violates the operating profile 435, as shown at block 750, the driver alarm 445 signal can be generated by the driver authentication system 450, as depicted at block 755. Otherwise, the process can be continued to block 740.

The driver authentication system includes features such as data logging, alarming, operation governance, ease of programmability and utilizes GPS technology to provide high-risk driver safety. The system provides user awareness that reduce the likelihood of a high-risk driver injury or fatality by helping the high-risk drivers with safe driving habits through immediate and real time feedback and governing. The programmable operating parameters associated with the real time driver feedback can categorize the system as unique driver safety device. Additionally, the system and method described herein can provide multiple operating profiles for a single vehicle that allows the owners to operate the vehicle without any restrictions yet have restrictions in affect when the vehicle is operated by the high risk driver.

It will be appreciated that variations of the above-disclosed and other features and functions or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A driver authentication and monitoring system, comprising:
a master control unit operating in a motor vehicle for authenticating at least one driver via a driver identification interface, wherein the master control unit receives a unique identification code that permits the at least one driver to operate the vehicle within an operating profile associated with the at least one driver and accessible by the master control unit; and
a slave control unit installed in the motor vehicle and coupled to at least one computer associated with the motor vehicle, wherein said slave control unit communicates with said master control unit and monitors an operation of the motor vehicle and transmits a signal to the master control unit if the at least one driver violates the operating profile, thereby providing feedback to the master control unit about a usage of the vehicle, and wherein the slave control unit cooperates with the at least one computer to control the operation of the vehicle based on commands received from the master control unit.

2. The driver authentication and monitoring system of claim 1, further comprising a database comprising a program module including at least one operating parameter associated with a vehicle, the program module remotely accessible by an authorized user to program an operating profile with respect to at least one driver, the program module accessed by the authorized user via a network utilizing a remote computer.

3. The driver authentication and monitoring system of claim 2, wherein the driver identification interface in conjunction with a remote computer loads the operating profile in the master control unit for the at least one driver.

4. The driver authentication and monitoring system of claim 1, further comprising: a GPS module; a memory module; and a function indicator module.

5. The driver authentication and monitoring system of claim 4, wherein the operating profile is loaded into the memory module for enabling controlled operation of the vehicle when the at least one driver is authenticated.

6. The driver authentication and monitoring system of claim 4, wherein the GPS module provides location information for the vehicle to at least the master control unit in association with a physical location of the vehicle.

7. The driver authentication and monitoring system of claim 1, wherein the slave control unit further comprises:
a power regulator module;
a starter relay module;
a definable relay module;
a slave microcontroller; and
an alarm synthesizer.

8. The driver authentication and monitoring system of claim 2, wherein the at least one operating parameter comprises at least one of:
a maximum allowable vehicle speed;
an allowable vehicle location;
allowable hours of operation; and
seatbelt usage.

9. The driver authentication and monitoring system of claim 1, wherein the slave control unit generates an alarm signal for alerting said authorized user when the at least one driver violates the operating profile.

10. The driver authentication and monitoring system of claim 1, wherein the driver identification interface comprises at least one of: a portable handheld device; a radio frequency identification device; and a USB compatible device.

11. A driver authentication and monitoring system, comprising:
   a master control unit in a motor vehicle for authenticating at least one driver via driver identification and associating an operating profile with the at least one driver;
   a GPS module providing at least location and speed information in association with movement of the motor vehicle;
   a data logging device recording vehicle operation data associated with use of the motor vehicle by the at least one driver including location and speed information from the GPS module; and
   a slave control unit installed in the motor vehicle and coupled to at least one computer associated with the motor vehicle, said slave control unit in communication with said master control unit and configured to monitor operation of the motor vehicle and generate a signal to the master control unit if the at least one driver violates the operating profile thereby providing feedback to the master control unit about usage of the vehicle, and wherein the slave control unit cooperates with the at least one computer to control operation of the vehicle based on commands received from the master control unit; wherein the master control unit permits the at least one driver to operate the vehicle within an operating profile if the master control unit receives at least one of a unique identification code to permit the at least one driver to operate the vehicle within an operating profile and the at least one driver has not violated the operating profile.

12. The driver authentication and monitoring system of claim 11, wherein the slave control unit further comprises:
   a power regulator module;
   a starter relay module;
   a definable relay module;
   a slave microcontroller; and
   an alarm synthesizer.

13. The driver authentication and monitoring system of claim 11, wherein the operating profile comprises at least one operating parameter including at least one of:
   a maximum allowable vehicle speed;
   an allowable vehicle location;
   allowable hours of operation; and
   seatbelt usage.

14. The driver authentication and monitoring system of claim 11, wherein the slave control unit generates an alarm signal for remotely alerting the authorized user when the at least one driver violates said operating profile.

15. A method of authenticating and monitoring drivers, comprising:
   providing a motor vehicle with a driver authentication and monitoring system;
   programming the driver authentication and monitoring system with an operating profile associated with a high risk driver, said operating profile maintained by a data logging device;
   authenticating the high risk driver to enable an operation of the motor vehicle by the high risk driver within limits of the operating profile by monitoring the operation of the motor vehicle to determine if the high risk driver is violating the operating profile;
   recording with the data logging device, data indicative of the operation of the motor vehicle by the high risk driver, said data including a speed and a location of the motor vehicle;
   generating a signal if said high risk driver violates the operating profile while operating the motor vehicle; and
   governing mechanical operations of the vehicle remotely if the high risk driver violates the operating profile.

16. The method of authenticating and monitoring drivers of claim 15, wherein the motor vehicle includes a GPS module and the monitoring operation of the motor vehicle further comprises obtaining GPS data including the speed and the location of the motor vehicle.

17. The method of authenticating and monitoring drivers of claim 15, wherein the step of generating a signal includes providing an audible alarm to the driver and a signal remotely to an authorized user.

18. The method of authenticating and monitoring drivers of claim 16, wherein the step of generating a signal includes providing an alarm remotely to an authorized user.

19. The method of authenticating and monitoring drivers of claim 15, wherein the step of generating an alarm signal includes providing a control signal that limits functionality within the motor vehicle.

20. The method of authenticating and monitoring drivers of claim 16, wherein the step of generating a signal includes providing a control signal that limits functionality of the motor vehicle.

* * * * *